(12) United States Patent
Wend et al.

(10) Patent No.: US 9,169,068 B2
(45) Date of Patent: Oct. 27, 2015

(54) RACK STORAGE AND RETRIEVAL DEVICE FOR A RACK STORAGE FACILITY, RACK STORAGE FACILITY WITH A RACK STORAGE AND RETRIEVAL DEVICE OF THIS TYPE AND METHOD FOR THE SEPARATE REMOVAL OF GOODS FROM A RACK STORAGE FACILITY OF THIS TYPE

(71) Applicant: Dürkopp Fördertechnik GmbH, Bielefeld (DE)

(72) Inventors: Michael Wend, Bielefeld (DE); Dirk Sieksmeier, Spenge (DE); Sigurd Völker, Vlotho (DE)

(73) Assignee: DUERKOPP FOERDERTECHNIK GMBH, Bielefeld (DE)

( * ) Notice: Subject to any disclaimer, the term of this patent is extended or adjusted under 35 U.S.C. 154(b) by 36 days.

(21) Appl. No.: 13/957,046

(22) Filed: Aug. 1, 2013

(65) Prior Publication Data
US 2014/0037403 A1  Feb. 6, 2014

(30) Foreign Application Priority Data

Aug. 1, 2012 (DE) .......................... 10 2012 213 592
Aug. 30, 2012 (DE) .......................... 10 2012 215 364

(51) Int. Cl.
*B65G 1/02* (2006.01)
*B65G 1/04* (2006.01)
*B65G 1/08* (2006.01)

(52) U.S. Cl.
CPC .............. *B65G 1/026* (2013.01); *B65G 1/0457* (2013.01); *B65G 1/08* (2013.01); *B65G 2201/0229* (2013.01)

(58) Field of Classification Search
CPC ......... B65G 1/08; B65G 1/0457; B65G 1/026
USPC .......................... 414/276, 279, 281, 285, 807
See application file for complete search history.

(56) References Cited

U.S. PATENT DOCUMENTS

| | | | | | |
|---|---|---|---|---|---|
| 3,674,159 | A | * | 7/1972 | Lemelson | ...................... 414/276 |
| 3,750,804 | A | * | 8/1973 | Lemelson | ...................... 414/276 |
| 4,307,988 | A | * | 12/1981 | Page et al. | ...................... 414/276 |
| 4,453,641 | A | * | 6/1984 | Rasmussen et al. | .......... 211/151 |
| 4,998,857 | A | | 3/1991 | Paravella et al. | |

(Continued)

FOREIGN PATENT DOCUMENTS

| | | |
|---|---|---|
| DE | 3735607 C1 | 5/1989 |
| DE | 19502003 A1 | 8/1995 |

(Continued)

OTHER PUBLICATIONS

DE 198 50 163 Translation.*

(Continued)

*Primary Examiner* — Kaitlin Joerger
(74) *Attorney, Agent, or Firm* — Browdy and Neimark, PLLC

(57) ABSTRACT

Rack storage and retrieval device for a rack storage facility, the rack storage and retrieval device comprising a carriage with a carriage drive to move the carriage on a base, a loading/removing rod that can be displaced by means of a lifting drive transverse to the base, at least one loading drive arranged on the loading/removing rod to load the rack storage facility with goods, and a separating unit for a separate removal of the goods from the rack storage facility.

17 Claims, 8 Drawing Sheets

(56) References Cited

U.S. PATENT DOCUMENTS

| | | | | |
|---|---|---|---|---|
| 5,156,513 | A | * 10/1992 | Galan et al. | 414/273 |
| 5,460,477 | A | 10/1995 | Macchiarulo et al. | |
| 5,799,769 | A | 9/1998 | Heer et al. | |
| 6,558,102 | B2 | * 5/2003 | Klein et al. | 414/282 |
| 2001/0051085 | A1 | * 12/2001 | Klein et al. | 414/282 |

FOREIGN PATENT DOCUMENTS

| | | |
|---|---|---|
| DE | 19500612 A1 | 7/1996 |
| DE | 29804038 U1 | 5/1998 |
| DE | 19850163 A1 | 5/1999 |
| DE | 10214471 A1 | 11/2002 |
| DE | 102007013863 A1 | 9/2008 |
| DE | 102008025778 A1 | 12/2009 |
| DE | 202010008717 U1 | 12/2010 |
| EP | 0333891 A1 | 9/1989 |
| EP | 2436617 A1 | 4/2012 |
| GB | 2286578 A1 | 8/1995 |
| JP | H02295806 A | 12/1990 |

OTHER PUBLICATIONS

European Search Report for Appln No. EP13177799 dated Oct. 18, 2013.

* cited by examiner

RACK STORAGE AND RETRIEVAL DEVICE FOR A RACK STORAGE FACILITY, RACK STORAGE FACILITY WITH A RACK STORAGE AND RETRIEVAL DEVICE OF THIS TYPE AND METHOD FOR THE SEPARATE REMOVAL OF GOODS FROM A RACK STORAGE FACILITY OF THIS TYPE

CROSS-REFERENCES TO RELATED APPLICATIONS

This application claims the priority of German Patent Application, Ser. No. 10 2012 213 592.8, filed Aug. 1, 2012, and of German Patent Application, Ser. No. 10 2012 215 364.0, filed Aug. 30, 2012, pursuant to 35 U.S.C. 119(a)-(d), the content of which is incorporated herein by reference in its entirety as if fully set forth herein.

FIELD OF THE INVENTION

The invention relates to a rack storage and retrieval device for a rack storage facility, a rack storage facility with a rack storage and retrieval device of this type and a method for the separate removal of goods from a rack storage facility of this type.

BACKGROUND OF THE INVENTION

A rack storage and retrieval device is known from DE 198 50 163 A1. In order to allow a separate removal of goods from a rack storage facility, a controllable stopper element is in each case provided on the storage rods of the rack storage facility. The stopper elements are in each case controllable by means of a control device, so that goods to be retrieved from storage can be released by means of the stopper element on the guide rods. The outlay in terms of apparatus and, in particular, control for a storage facility of this type and, in particular, the rack storage and retrieval device cooperating therewith is large. The placing of separate goods into storage and retrieving them is expensive.

A gripper system for removing individual goods from a rack storage facility is known from DE 20 201 008 717 U1. DE 195 00 612 A1 relates to a codable adaptor for use with a suspension conveyor system. DE 298 04 038 U1 relates to a separator for hangers hanging on conveyor sections.

A rack storage facility in the form of a high-rack storage facility is in each case known from DE 10 2007 013 863 A1, from DE 102 14 471 A1 and from DE 10 2008 025 778 A1, with a rack storage and retrieval device which, on the one hand, is used to load the high-rack storage facility and, on the other hand, to remove goods from the high-rack storage facility. For this purpose, goods, in particular clothing items arranged on clothes hangers, are arranged on a storage rod of the high rack and the complete storage rod equipped with goods is removed by the rack storage and retrieval device and transported away. The rack storage facilities mentioned allow a removal of goods exclusively in large quantities. Goods that are not required and retrieved from storage have to be sorted and then either stored in the high-rack storage facility or at a location. In any case, an additional storage of the goods that are not required but have nevertheless been retrieved from storage is necessary. The removal of goods from a high-rack storage facility of this type is laborious.

SUMMARY OF THE INVENTION

An object of the present invention is to design a rack storage and retrieval device for a rack storage facility in such a way that the removal of goods from the rack storage facility is simplified and, in particular, the separate removal of goods from the rack storage facility is made possible.

This object is achieved according to the invention by a rack storage and retrieval device for a rack storage facility, wherein the rack storage and retrieval device comprises a base device, at least one loading/removing rod fastened to the base device, at least one loading drive arranged on the loading/removing rod to load the rack storage facility with goods, and a separating unit for a separate removal of the goods from the rack storage facility.

According to the invention it was recognized that a rack storage and retrieval device has a separating unit for a separate removal of goods from a rack storage facility, in particular a high-rack storage facility. The separating unit is, in particular, an active component, in particular drivable by means of a drive. The active separating unit can, in particular, cooperate with a passively configured component, in particular a locking unit, which, in particular, is arranged on a storage rod of a high-rack storage facility, for the separate removal of goods from the rack storage facility. This means that for the separate removal of the goods, in particular precisely, a separating unit is required. In particular, it is not necessary for an active separating unit to be provided on each storage rod. The outlay for apparatus for the rack storage and retrieval device and the rack storage facility is thereby reduced. In particular, the cooperation between the active separating unit of the rack storage and retrieval device and the locking unit on a storage rod is made possible by an unlocking unit, which is, in particular, provided on a loading/removing rod of the rack storage and retrieval device. As a result, it is possible for individual goods, in particular clothing items, to be removed in a separate and targeted manner from the rack storage facility using the rack storage and retrieval device. In particular, it is conceivable for individual goods from various storage rods of the rack storage facility to be removed in one removal process and received on a loading/removing rod of the rack storage and retrieval device. To load the rack storage facility, the loading/removing rod has a loading drive. In particular, goods can be pushed therewith onto a storage rod of the rack storage facility. The rack storage and retrieval device comprises a base device. The rack storage and retrieval device can be arranged with the base device, in particular on the base and may be configured to be displaceable along the base. It is alternatively also possible for the base device to be displaceable, for example arranged hanging on a guide system arranged above the rack storage facility. The base device may have a carriage with a carriage drive to move the carriage on the base. In particular, the carriage allows movement in the plane. Furthermore, the base device may comprise a lifting drive. The lifting drive allows a displacement of the loading/removing rod in a direction transverse to the base. In particular, the lifting drive is guided along a vertical column. The vertical column is, in particular, fixed to the carriage and, in particular, oriented perpendicular to a carriage plane formed by the carriage. The rack storage and retrieval device is suitable for the separate removal of goods from a rack storage facility of various types. The rack storage and retrieval device allows separate removal of goods, for example from a high-rack storage facility, from a single-level rack storage facility and from a moving rack storage facility, in which the storage rods can be displaced.

A rack storage and retrieval device with a control unit comprising a control unit for the automatically controlled removal of the goods from the rack storage facility allows an automated and, in particular fully automated, removal of goods from the rack storage facility. In particular, it is possible to assemble a pre-picked goods selection, in other words a specific combination of individual goods, which, in particular, are arranged on various storage rods of the rack storage facility and to remove them from the rack storage facility by means of the rack storage and retrieval device. The control unit may also allow the rack storage facility to be loaded.

A rack storage and retrieval device comprising an identification unit to identify the goods removed allows the removal process to be monitored. In particular, this can rule out goods being removed in an undesired quantity, in other words in too great or too small a piece number. The identification unit may be configured to identify the goods removed. In particular, the identification unit is a transponder reader. For this purpose, the identification unit can be configured as a barcode reader. A color coding to identify the goods, which can be optically detected by the identification unit, can also be used.

A rack storage and retrieval device , in which the identification unit is a transponder reader, a scanner or a light barrier, allows a direct and uncomplicated identification of the goods removed. By using a transponder reader as the identification unit, additional information can be read out from a transponder during the removal. For example, it is conceivable for the transponder to carry information such as, for example, the type of goods, an article number, a date when the goods were placed into storage, size, color and designer of a clothing item. A scanner or a light barrier allows a particularly economical identification of the removal process.

A rack storage and retrieval device with a separating unit, in which the separating unit has an actuator, in particular a pneumatic actuator, allows a direct engagement in the removal process. The separating unit allows a mechanically assisted removal of the desired goods.

A rack storage and retrieval device, in which the goods are held individually on the loading/removing rod by means of an adapter, facilitates the handling of the goods. In particular, handling with the rack storage and retrieval device and the rack storage facility is possible independently of the goods themselves. As a result, it is possible to easily handle goods that are different from one another separately. The use of an adaptor allows a defined interface for the rack storage and retrieval device and the rack storage facility with respect to the storage and handling of the goods.

A further object of the present invention is to provide a rack storage facility in such a way that the removal of goods is simplified and, in particular, the separate removal of goods is made possible.

This object is achieved according to the invention by a rack storage facility comprising at least one storage rod for storing goods and a rack storage and retrieval device according to the invention, wherein the loading/removing rod can be arranged adjacent to the at least one storage rod forming a common transfer section to load the rack storage facility with goods and for the separate removal of goods from the rack storage facility.

It was recognized according to the invention that a rack storage facility has at least one storage rod for storing goods, it being possible for a rack storage and retrieval device with the loading/removing rod to be arranged adjacent to the at least one storage rod forming a common transfer section. The loading/removing rod and the storage rod are arranged one behind the other along their rod longitudinal axes. It is possible for the rod longitudinal axes, which are in each case, in particular, linear, to have, in the region of the transition between the storage rod and the loading/removing rod, a slight bend, in other words a slight deviation from a straight course of the rod in the region of the transition. A bend of this type has an angle of at least 170°, in particular at least 175° and in particular at least 177°. The common transfer section is used to load the rack storage facility with goods and to remove goods from the rack storage facility.

A rack storage facility comprising a locking unit arranged on the at least one storage rod for locking the goods on the at least one storage rod allows secure storage of the goods on the at least one storage rod. In particular, if the storage rod is inclined relative to a horizontal in order to allow an automatic conveyance due to gravity of goods along the rod longitudinal axis, a locking unit is used for the secure locking of the goods on the storage rod. An inadvertent removal of the goods is ruled out.

In a rack storage facility comprising an unlocking unit arranged on the loading/removing rod for unlocking the locking unit, an unlocking unit is provided on the loading/removing rod of the rack storage and retrieval device. The unlocking unit corresponds with the locking unit if the at least one storage rod. The unlocking unit is used to unlock the locking unit. The unlocking unit allows, in particular, the locking unit to be automatically unlocked when the loading/removing rod is arranged in a transfer arrangement, in other words is located adjacent to the at least one storage rod forming the common transfer section.

A rack storage facility comprising at least one feed section and at least one retrieval section allows the goods to be placed rapidly and directly in storage and removed from storage by means of the rack storage and retrieval device. A feed section and a retrieval section are, in particular, arranged in such a way that they can be brought into a transfer arrangement with the loading/removing rod of the rack storage and retrieval device. As a result, it is possible to displace goods rapidly and in an uncomplicated manner onto the loading/removing rod and to remove them again from the loading/removing rod.

A rack storage facility comprising a plurality of storage rods, which are arranged in particular horizontally spaced apart from one another, in particular vertically spaced apart from one another and in particular at opposing free ends of the loading/removing rod, allows an effective utilization of the rack storage facility with a single rack storage and retrieval device. The storage capacity is high. It is possible to place many goods in storage in the rack storage facility with a high density, i.e. with a small space requirement. The storage facility maintenance costs are reduced. A storage facility of this type with a high storage capacity is, for example, a high-rack storage facility. In a high-rack storage facility, a plurality of storage rods is arranged spaced apart from one another horizontally. These storage rods form a storage level. A plurality of and, in particular, at least three storage levels are arranged above one another, i.e. vertically spaced from one another, in a high-rack storage facility. In a high-rack storage facility, the storage rods are arranged stationarily. It is possible for the storage rods of a high-rack storage facility to be arranged with the end faces spaced apart and facing one another. The storage rods of a high-rack storage facility of this type form a storage passage, in which the rack storage and retrieval device is arranged. A moving rack storage facility also has a high storage capacity. A plurality of storage rods are arranged in a storage rod plane in a moving rack storage facility. A moving rack storage facility may comprise a plurality of storage rod planes. A moving rack storage facility allows a displacement of the storage rods along a moving rack displacement path. The storage rods are displaceable and, in particular, not stationary.

A further object of the present invention is to provide a method for the separate removal of goods from a rack storage facility.

This object is achieved according to the invention by a method for the separate removal of goods from a rack storage facility comprising the method steps provide a rack storage facility according to the invention, arranging the rack storage and retrieval device at the at least one storage rod forming a common transport section, separate removal of goods from the rack storage facility by separate transport of the goods from the at least one storage rod onto the loading/removing rod.

It was recognized according to the invention that by providing a rack storage facility according to the present invention and a corresponding rack storage and retrieval device, goods can be removed separately from the rack storage facility. The advantages of the method substantially correspond to the advantages of the rack storage and retrieval device and the rack storage facility, to which reference is hereby made.

Embodiments of the invention will be described in more detail below with the aid of the drawings

DESCRIPTION OF THE PREFERRED EMBODIMENTS

Figure 1:
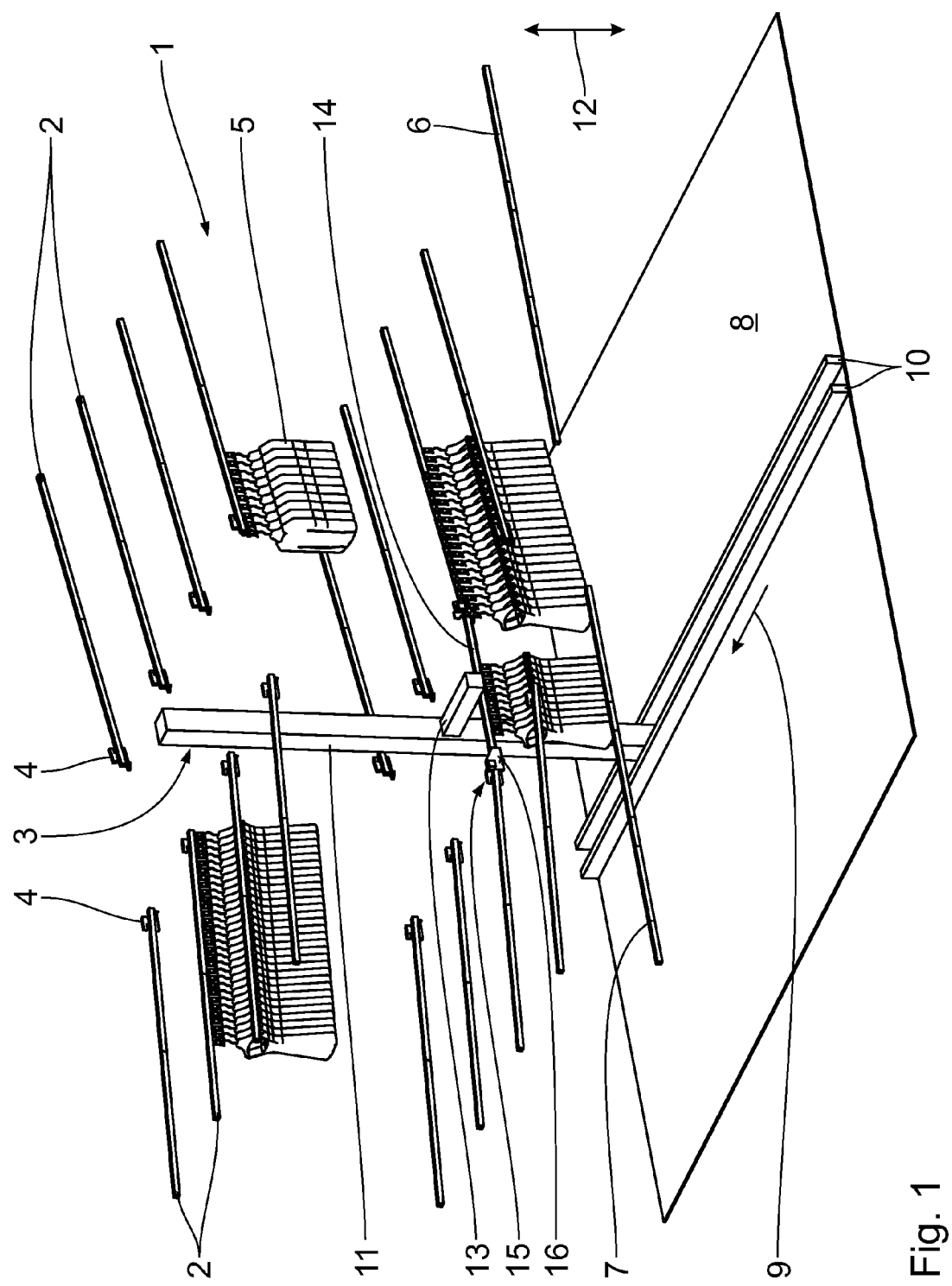
FIG. 1 shows a perspective view of a high-rack storage facility with a rack storage and retrieval device according to a first embodiment.

A high-rack storage facility designated 1 as a whole in FIG. 1 comprises a plurality of storage rods 2. The storage rods 2 are, in each case, arranged in groups of four in two levels symmetrically on both sides with respect to a rack storage and retrieval device 3. This means that the rack storage and retrieval device 3 is arranged between two respective storage rods 2 of the high-rack storage facility 1 arranged in an opposing manner. The storage rods 2 are in each case inclined relative to a horizontal plane, the incline being directed toward the rack storage and retrieval device 3. The incline is, for example, 10°. At an end facing the rack storage and retrieval device 3, each storage rod 2 has a locking unit 4. Goods 5, in particular in the form of clothing arranged on clothes hangers, can be stored on the storage rods 2. Because of the incline of the storage rod 2, goods 5 can slip or slide automatically to an end facing the rack storage and retrieval device 3 in the region of the locking unit 4. In this position adjacent to the locking unit 4, the goods 5 can be removed from the rack storage and retrieval device 3. The displacement of the goods 5 on the storage rod 2 to the locking unit 4 can take place, additionally or alternatively to the incline, by a drive. In particular, it is provided that exclusively identical goods are arranged on a storage rod 2. Different goods are preferably stored on different storage rods 2. In total, the high-rack storage facility 1 in FIG. 1 has 16 storage rods 2.

The high-rack storage facility 1 furthermore comprises a feed section 6 and a retrieval section 7. Goods 5 can be displaced onto the rack storage and retrieval device 3 via the feed section 6 to be stored on storage rods 2 in the high-rack storage facility 1. For this purpose, the feed section 6 may have a feed drive, not shown. In addition or alternatively, it is also conceivable for the feed section 6 to be inclined relative to the horizontal toward the rack storage and retrieval device 3. According to the embodiment shown in FIG. 1, the feed section 6 is arranged horizontally, in other words without an incline.

The retrieval section 7 may have a retrieval drive, not shown, for retrieving the goods 5 from storage in order to displace the goods 5 away from the rack storage and retrieval device 3 along the retrieval section 7 to the left. Additionally or alternatively, the retrieval section 7 may be inclined relative to the horizontal, in order to allow automatic transport of the goods 5 away from the rack storage and retrieval device 3.

According to the embodiment shown in FIG. 1, the retrieval section 7 is arranged horizontally, in other words not inclined.

In the embodiments not shown of the lifting rack storage facility 1, a plurality of feed sections 6 and/or a plurality of retrieval sections 7 may also be present.

The rack storage and retrieval device 3 will be described in more detail below with the aid of FIGS. 2 to 6. The rack storage and retrieval device 3 comprises a base device with a carriage, which is not shown in detail, which has a carriage drive, not shown. By means of the carriage, the rack storage and retrieval device 3 can be displaced on a base 8. According to the embodiment shown, the carriage is a slide, not shown, which allows a linear guide movement of the rack storage and retrieval device 3 along a guide direction 9. The slide is displaceably guided on guide rails 10 along the guide direction 9. It is also conceivable for the guide rails 10 to not run linearly and in particular to represent a guide direction 9 which is curved at least in portions. The guide rails 10 are rigidly anchored on or in the base 8. It is possible for the anchoring to be releasable, so that the guide direction 9 can be variably fixed by means of the guide rails 10.

A vertical column 11, which moves together with the slide along the guide direction 9, is fastened to the slide, not shown. A lifting drive, not shown in more detail, which allows a lifting movement along a vertical direction 12, is provided on the vertical column 11. The lifting drive allows lifting and lowering along the vertical direction 12. Connected to the lifting drive is a horizontally arranged carrier arm 13, which carries a loading/removing rod 14. The loading/removing rod 14 is horizontally oriented with its rod longitudinal axis. The loading/removing rod 14 is fastened in a central region on the carrier arm 13 and oriented perpendicular to the carrier arm 13. In a variant, not shown, of the rack storage and retrieval device 3 more than one loading/removing rod 14 may also be present.

The loading/removing rod 14 has two free ends 15, which can be arranged pair-wise with mutually opposing storage rods 2 in a transfer arrangement of the loading/removing rod 14 in such a way that the loading/removing rod 14 and the storage rods 2 arranged adjacent thereto are arranged in a common transfer section to load the high-rack storage facility 1 with goods 5 and to remove goods 5 from the high-rack storage facility 1. According to the view in FIG. 1, the loading/removing rod 14 is in the transfer arrangement with a pair of opposing storage rods 2, which are arranged in the lower level as a second pair adjacent to the feed section 6 and the retrieval section 7 along the guide direction 9. This means that the common transfer section is implemented by a relative displacement of the loading/removing rod 14 and at least one storage rod 2. The relative displacement takes place by means of an active displacement of the rack storage and retrieval device 3 on the base 8, in particular along the guide direction 9, and of the loading/removing rod 14 along the vertical direction 12. The storage rod 2 remains stationary.

A separating unit 16 is in each case provided at the free ends 15 of the loading/removing rod 14. The separating unit 16 is used for the separate removal of the goods 5 from the high-rack storage facility 1. The separating unit 16 cooperates with the locking unit 4 of the storage rods 2 for the separate removal of the goods 5.

The loading/removing rod 14 is substantially configured as a U-shaped profile tube opened downwardly. Provided at the opening of the U arranged at the bottom are undercut webs, which allow rolling/sliding bodies 17 of an adaptor 18 to roll or slide along the rod longitudinal axis of the loading/removing rod 14. The adaptors 18 can in each case be displaceably guided on the storage rods 2, the loading/removing rod 14, the feed section 6 and the retrieval section 7. Each adaptor 18 also has a receiving opening 19, in which the individual goods 5 are suspended by means of a clothes hanger 20 and therefore fastened to the adaptor 18. The adaptor 18 allows uncomplicated handling of the goods 5 or the clothes hangers 20 carrying the goods 5. A change in the hanger shape, in particular, does not inevitably lead to an impairment of the handling thereof. The adaptor 18 also has a transponder chip 21. The transponder chip 21 carries information with respect to the goods 5 stored on the adaptor 18. For example, stored on the transponder chip 21, are the type of goods, in particular the type of clothing item, the producer, the color of the clothing item, the size, the material and other properties. The transponder chip 21 is, in particular, overwritable, so the transponder chip 21 can be repeatedly used.

According to the embodiment shown, the rack storage and retrieval device 3 has an identification unit to automatically identify the goods removed. The identification unit is configured as a transponder reader 22. The transponder reader 22 is arranged at the free end 15 of the loading/removing rod 14 in such a way that when the loading/removing rod 14 and the storage rod 2 are in the transfer arrangement, the transponder reader 22 allows a transponder chip 21 of the adaptor 18, which faces the loading/removing rod 14, to be read. Instead of the transponder chip 21 and the transponder reader 22, the goods 5 removed can also be identified in a different form, for example by means of an identification means in the form of a barcode reader or by means of an optical detection of a color coding of the goods 5.

A first loading drive 23 and a second loading drive 24 are provided on the rack storage and retrieval device 3. The loading drives 23, 24 in each case have a control element, which can be made to engage with the adaptors 18. The control elements can be displaced along the rod longitudinal axis of the loading/removing rod 14 and can be driven by means of a drive, not shown. The goods 5 stored on the adaptors 18 can be pushed onto one of the storage rods 2 by means of the loading drives 23, 24 and the high-rack storage facility 1 can thus be loaded. For this purpose, it is necessary for the loading/removing rod 14 to be arranged in the transfer arrangement, in other words adjacent to a corresponding storage rod 2. According to the arrangement shown in FIG. 2, the first loading drive 23 is used to load the storage rod 2 shown on the right, the second loading drive 24 being used to load the storage rod 2 shown on the left.

Figure 2:
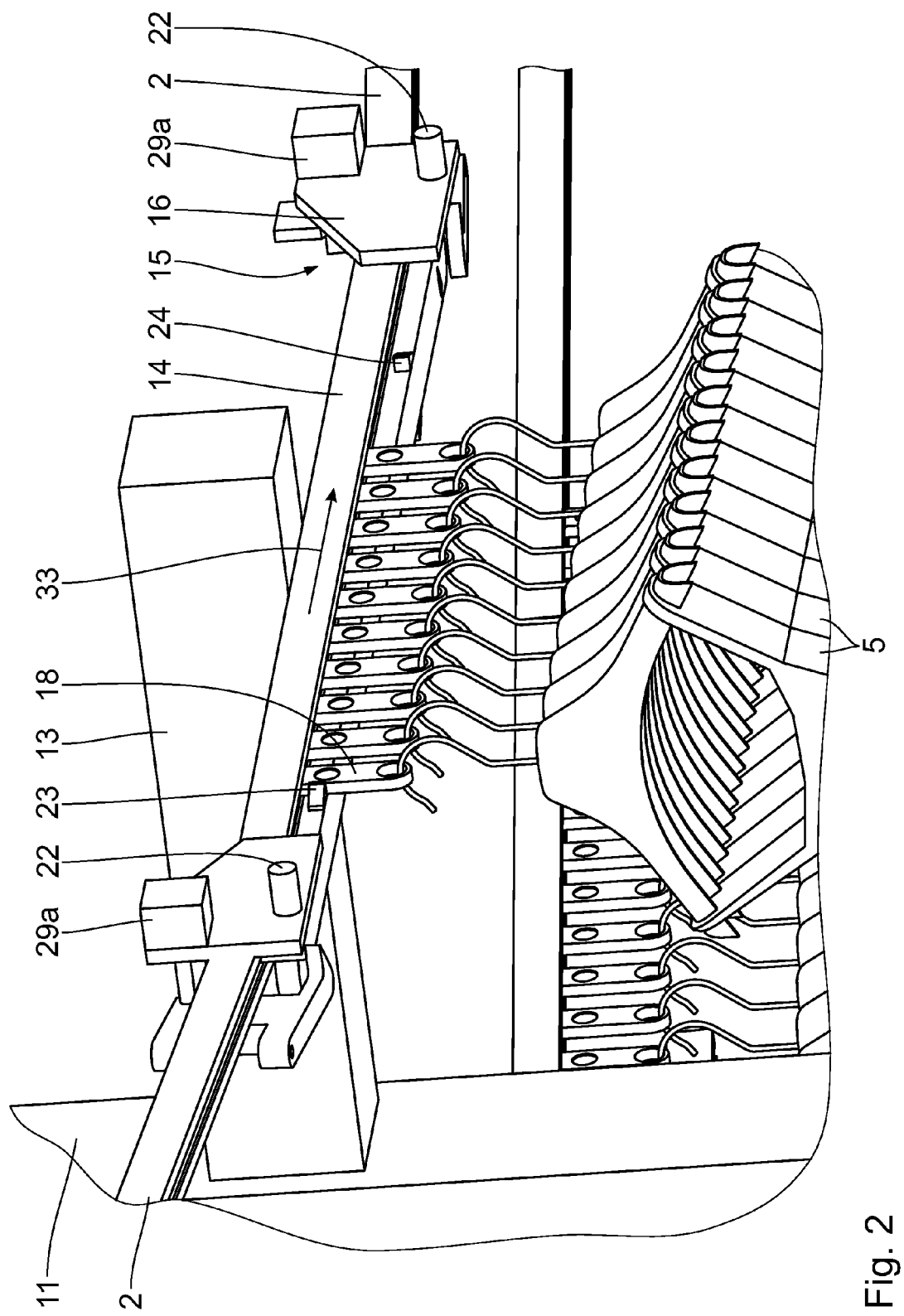
FIG. 2 shows a perspective, enlarged view of the rack storage and retrieval device according to FIG. 1 with goods arranged thereon.

The two loading drives 23, 24 are, in particular, rigidly coupled to one another, for example by means of a belt or chain drive. When the first loading drive 23 according to FIG. 2 is displaced to the right along a first loading direction 33, the second loading drive 24 is simultaneously displaced along the same direction. When the second loading drive 24 reaches a free end 15 of the loading/removing rod 14, it is guided on a deflection roller to a rear side of the loading/removing rod 14 facing the vertical column 11.

Figure 3:
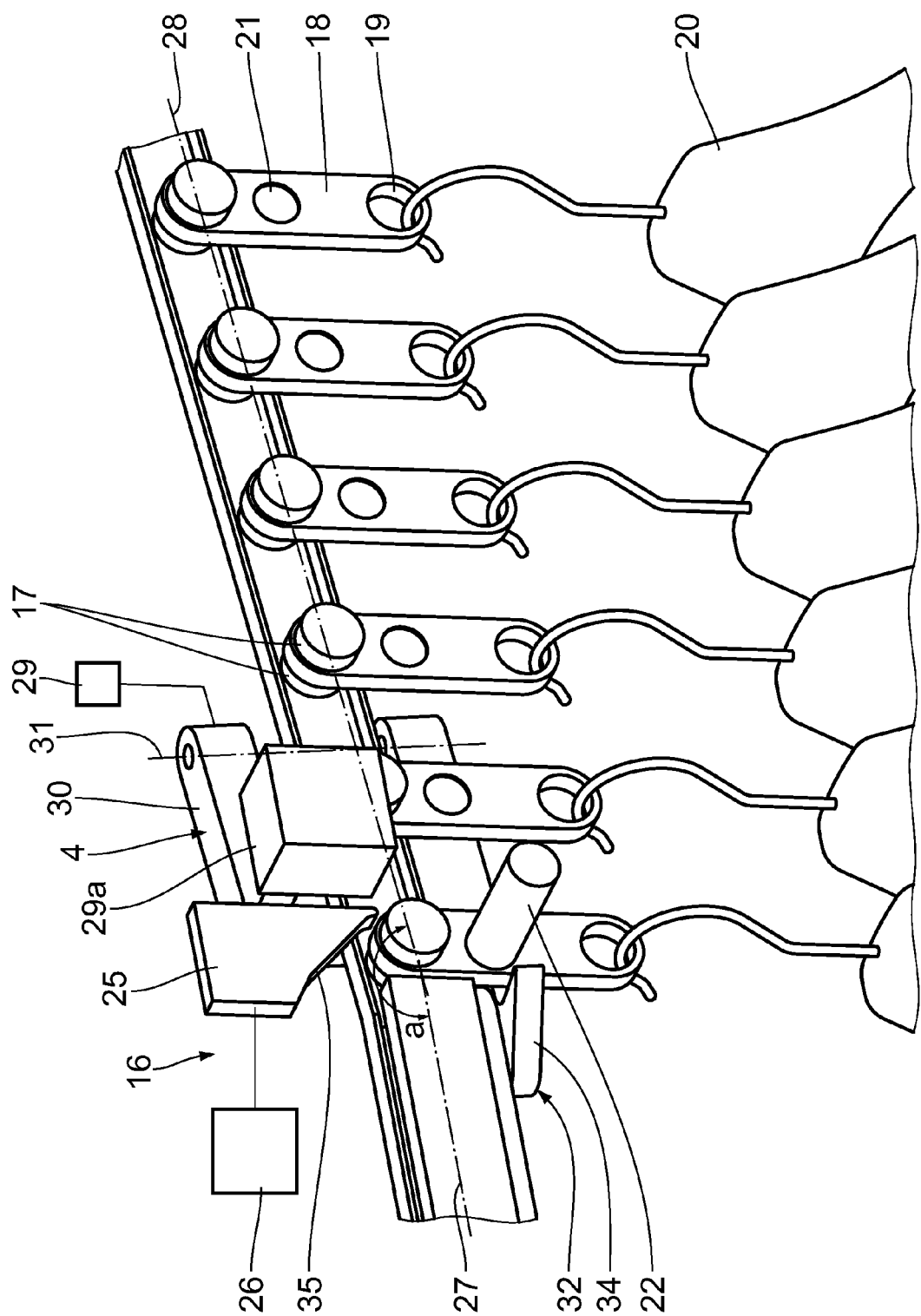
FIG. 3 shows a perspective, enlarged view of a separate removal of goods using the rack storage and retrieval device according to FIG. 1 with a locking unit in a locking position.

The separating unit 16 comprises a separating element 25 that is displaceable along the vertical direction 12, which is vertically displaceable by means of a pneumatic actuator 26, which is shown schematically in FIG. 3.

The loading/removing rod 14 has a rod longitudinal axis 27. The storage rod 2 has a rod longitudinal axis 28. In the transfer arrangement, shown in FIG. 3, of the loading/removing rod 14, the longitudinal axes 27, 28 intersect in the region of the separating unit 16. An intersection angle a between the longitudinal axes 27, 28, in other words a deviation of the loading/removing rod 14 from a completely straight course, according to the embodiment shown is about 175°. In the region of the separating unit 16, the loading/removing rod 14 is thus bent by a small angle, which is 5° in the example shown, but may also be in the region of 3°. The intersection angle a is, in particular, such that a displacement of the goods 5 from the loading/removing rod 14 to a storage rod or from a storage rod 2 onto the loading/unloading 14 is not impaired.

The locking unit 4 of the storage rod 2 will be described in more detail below. The locking unit 4 has an actuable claw element 30, in particular actuable by means of a pneumatic actuator 29 shown schematically in FIG. 3. The claw element 30 is laterally offset along the longitudinal axis 28 with respect to the storage rod 2. The claw element 30 is pivotable about a vertical pivot axis 31 relative to the storage rod 2 by means of the actuator 29. In the locking arrangement of the locking element 4 shown in FIG. 3, the claw element 30 is arranged in such a way that a claw 32 formed on the claw element 30 engages behind an adaptor 18 in such a way that a displacement of the adaptor 18 along the longitudinal axis 28 to remove the goods 5 from the storage rod 2 is blocked. It is conceivable that the actuation of the claw element 30, which is also called a pawl, takes place in a spring-loaded manner. This means that as soon as an actuating force exerted by the actuator 29 on the claw element 30 is absent, the claw element 30 is automatically displaced back into the locking arrangement according to FIG. 3. This may, for example, take place in that a torsion spring, not shown, is arranged along the pivot axis 31. The actuator for actuating the claw element 30 may also be arranged on the side opposing the loading/removing rod 14 and be mounted on the separating unit 16, as indicated in the drawing at 29a.

A method for loading and unloading the high-rack storage facility 1 will be described in detail below.

In a first step, goods 5 are provided on adaptors 18 via the feed section 6 of the high-rack storage facility 1. The rack storage and retrieval device 3 is then arranged in a transfer arrangement with respect to the feed section 6. For this purpose, the carriage and the vertical column 11 arranged thereon is displaced along the guide direction 9 toward the feed section 6. Additionally, the loading/removing rod 14 is brought to a vertical level with the feed section 6 by means of the lifting drive. As soon as the loading/removing rod 14 is in the transfer arrangement with respect to the feed section 6, the goods 5 are displaced from the feed section 6 onto the loading/removing rod 14.

The rack storage and retrieval device 3 has a signal connection to a control unit, in particular arranged centrally, not shown, of the high-rack storage facility 1. By means of the control unit, a target position for the goods 5 to be placed in storage is transmitted to the rack storage and retrieval device 3. Thereupon, a target position, in other words a storage rod 2, on which the goods 5 are to be stored, is automatically approached by the rack storage and retrieval device 3, in that the carriage is moved along the guide direction 9 and the loading/removing rod 14 is moved by means of the lifting drive by means of the carrier arm 13 along the vertical direction 12 into the corresponding target position. The movement sequence, in other words the displacement along the guide direction 9 and along the vertical direction 12, can take place sequentially, in other words one after the other, or synchronously, in other words simultaneously.

As soon as the loading/removing rod 14 is arranged in the transfer arrangement according to FIG. 2, the adaptors 18 held on the loading/removing rod 14 are pushed with the goods 5 fastened thereon by means of the first loading drive 23 onto the storage rod 2, shown on the right in FIG. 2, along the first loading direction 33. The first loading direction 33 is oriented parallel to the rod longitudinal axis 14.

To allow loading of the storage rod 2, in other words to allow the adaptors 18 to be pushed from the loading/removing rod 14 onto the storage rod 2, it is necessary for the adaptors 18 to be pushed past the claw 32 of the claw element 30 onto the storage rod 2. For this purpose, the claw 32 has an introduction bevel 34. The introduction bevel 34, by means of pushing an adaptor 18 along the first loading direction 33, allows the claw 32 to be pressed away transverse to the loading direction 33, so the claw element 30 is pivoted up about the pivot axis 31. As soon as the adaptor 18 has been displaced on the claw element 30 along the loading direction 33, the claw element 30, because of the spring-loaded mounting, automatically pivots back into the locking position.

In addition or alternatively, it is conceivable for the claw element 30 to be actively unlocked by means of the actuator 29 and pivoted away from the storage rod 2 about the pivot axis 31 to simplify loading of the storage rod 2.

The loading process is, in particular, completed when the first loading drive 23 adopts a defined end position on the loading/removing rod 14, which, in particular, is detected by means of an end switch, not shown, and is supplied to the control unit. The rack storage and retrieval device 3 allows a rapid, direct and uncomplicated loading of a plurality of, in particular identical goods 5 onto a storage rod 2.

For a removal of goods 5 from the storage rods 2 of the high-rack storage facility 1, the loading/removing rod 14 of the rack storage and retrieval device 3 is activated by means of the control unit and target goods 5 are displaced into a desired target position for removal. In order to determine a desired target position of the loading/removing rod 14, a current inventory is stored in the control unit. In particular, what type of goods 5 at which position, i.e. on which storage rod 2 is stored in the high-rack storage facility 1, is stored in the control unit.

Before goods 5 specifically to be removed are removed from the high-rack storage facility 1, the information from the transponder chip 21 is read by means of the transponder reader 22 at the adaptor 18 of the goods 5 to be removed. If differing information is determined, an incorrect removal can be prevented. This transponder function can also be dispensed with in a simpler configuration of the rack storage and retrieval device 3.

An arrangement of this type is shown in FIG. 3. With the arrangement in the transfer arrangement, shown in FIG. 3, of the loading/removing rod 14, the separating unit 16 arranged on the rack storage and retrieval device 3 cooperates with the locking unit 4, which is arranged on the respective storage rod 2, in such a way that it is possible to unlock and open the locking unit 4. For this purpose, the separating unit 16 and the locking unit 4 have a signal connection to the control unit. In particular, it is conceivable for the separating unit 16 to actuate an end switch, not shown, which transmits an unlocking signal via the control unit to the locking unit 4. The unlocking signal brings about an unlocking of the locking unit 4.

Figure 4:
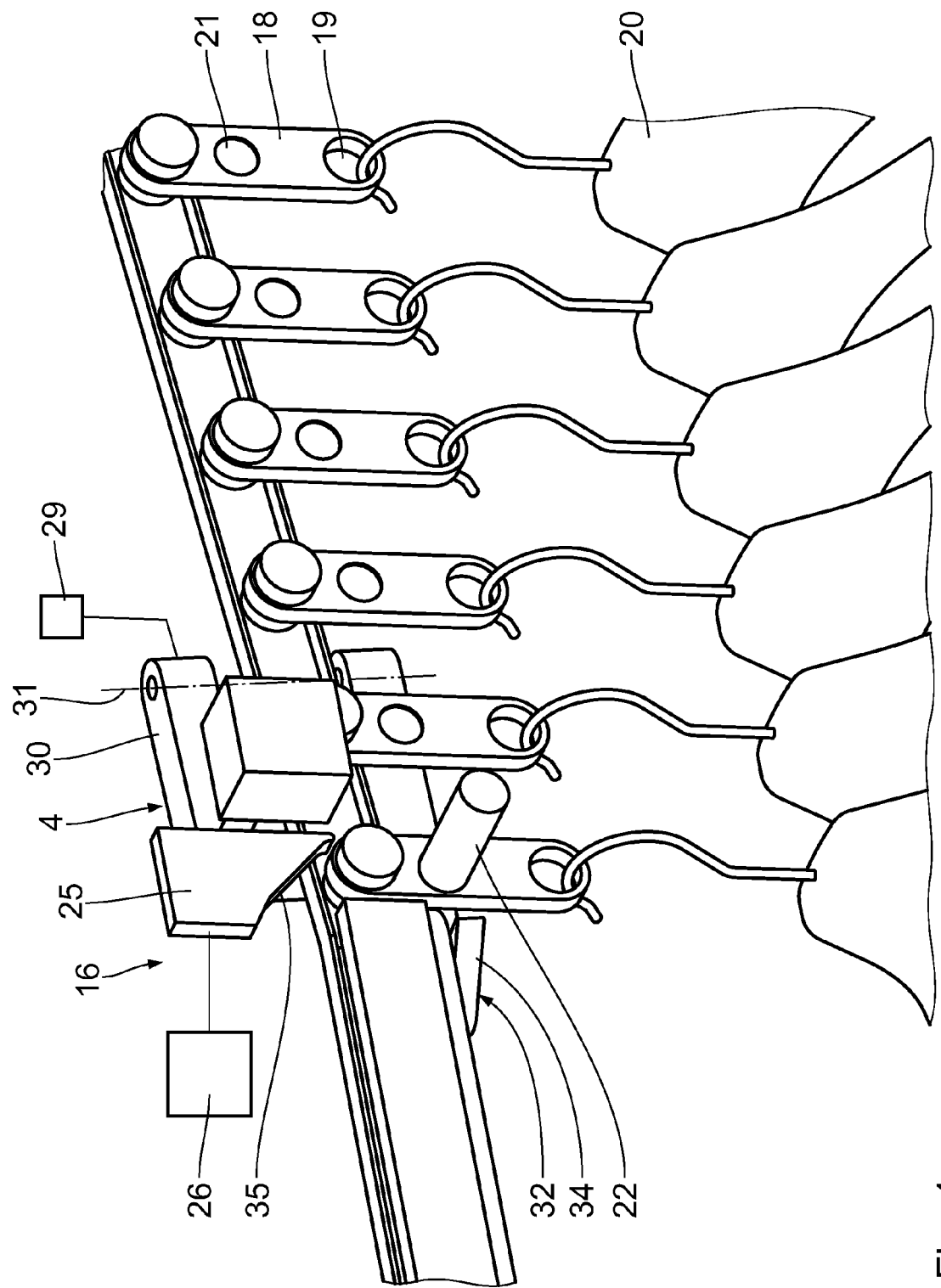
FIG. 4 shows a view corresponding to FIG. 3 with the locking unit in an unlocking position.

Proceeding from the arrangement in FIG. 3, the locking unit 4 is unlocked and opened by an unlocking unit in the form of the actuator 29, in that the claw element 30 is pivoted about the pivot axis 31 away from the storage rod 2. The opened, unlocked arrangement of the locking element 4 is shown in FIG. 4. In this arrangement, the adaptor 18 facing the loading/removing rod 14 is not held. Because of the inclined arrangement of the storage rod 2, the adaptor 18 rolls or slides automatically from the storage rod 2 onto the loading/removing rod 14. It is, for example, conceivable for an automatic displacement of the goods 5 from the storage rod 2 onto the loading/removing rod 14 to be impeded as a consequence of a self-locking or when a plurality of goods 5 already removed is arranged on the loading/removing rod 14. To overcome impeding of this type, the storage rod 2 may have a drive.

Figure 5:
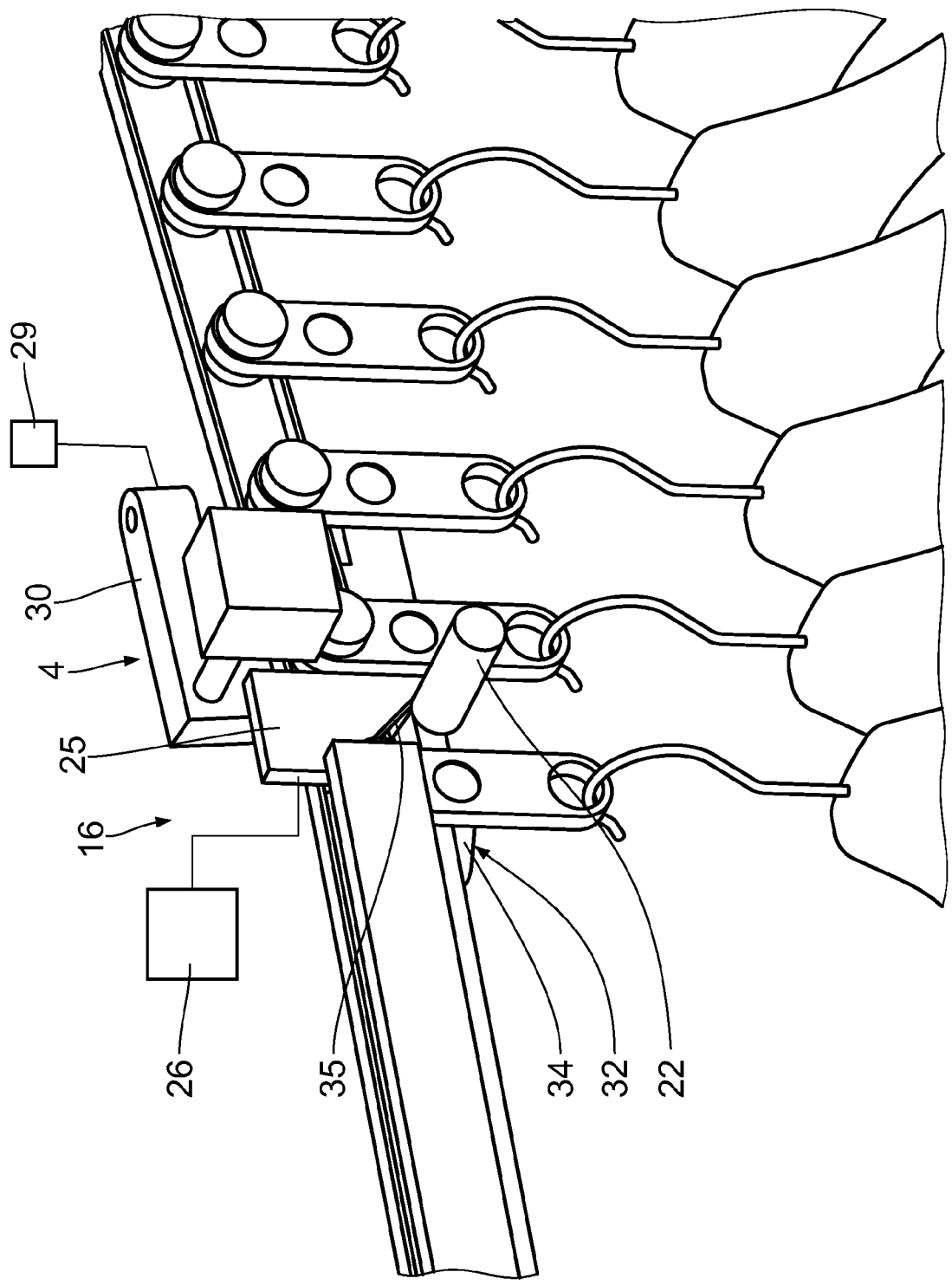
FIG. 5 shows a view corresponding to FIG. 4 with a separating unit in an engagement position.

To prevent a plurality of adaptors 18 unintentionally being displaced from the storage rod 2 onto the loading/removing rod 14, in other words that an unintentional removal of a plurality of goods 5 taking place, the separating element 25 is displaced downwardly along the vertical direction 12, in order to prevent a removal of the adaptor 18 arranged second from the left in FIG. 3. The separating element 25 has a separating bevel 35 facing the adaptor 18 to be removed. The separating bevel 35 is, in particular, configured in such a way that when the second adaptor 18 is stopped, the first adaptor 18 is simultaneously acted upon with a transverse force to assist a displacement along the rod longitudinal axis 27. Owing to the lowering of the separating element 25, it comes into contact with the adaptor 18 in the region of the separating bevel 35. As a result, the adaptor 18 is pushed from the storage rod 2 onto the loading/removing rod 14. The opening of the locking unit 4, which is shown in FIG. 4, and the lowering of the separating element 25, which is shown in FIG. 5, typically takes place in a synchronized manner and substantially simultaneously. The illustration of the method steps of opening the locking unit and the lowering of the separating element 25 in FIGS. 4 and 5 serves substantially for better understanding. The drives for the separating element 25 and the claw element 30 may, in particular, be mechanically coupled to one another by means of spring prestresses. An interplay of the separating element 25 and the claw element 30 when conveying separated adaptors 18 can take place in the manner of a ballpoint pen mechanism. A maximum time lag between the opening of the locking unit 4 and the actuation of the separating unit 16 is small.

Figure 6:
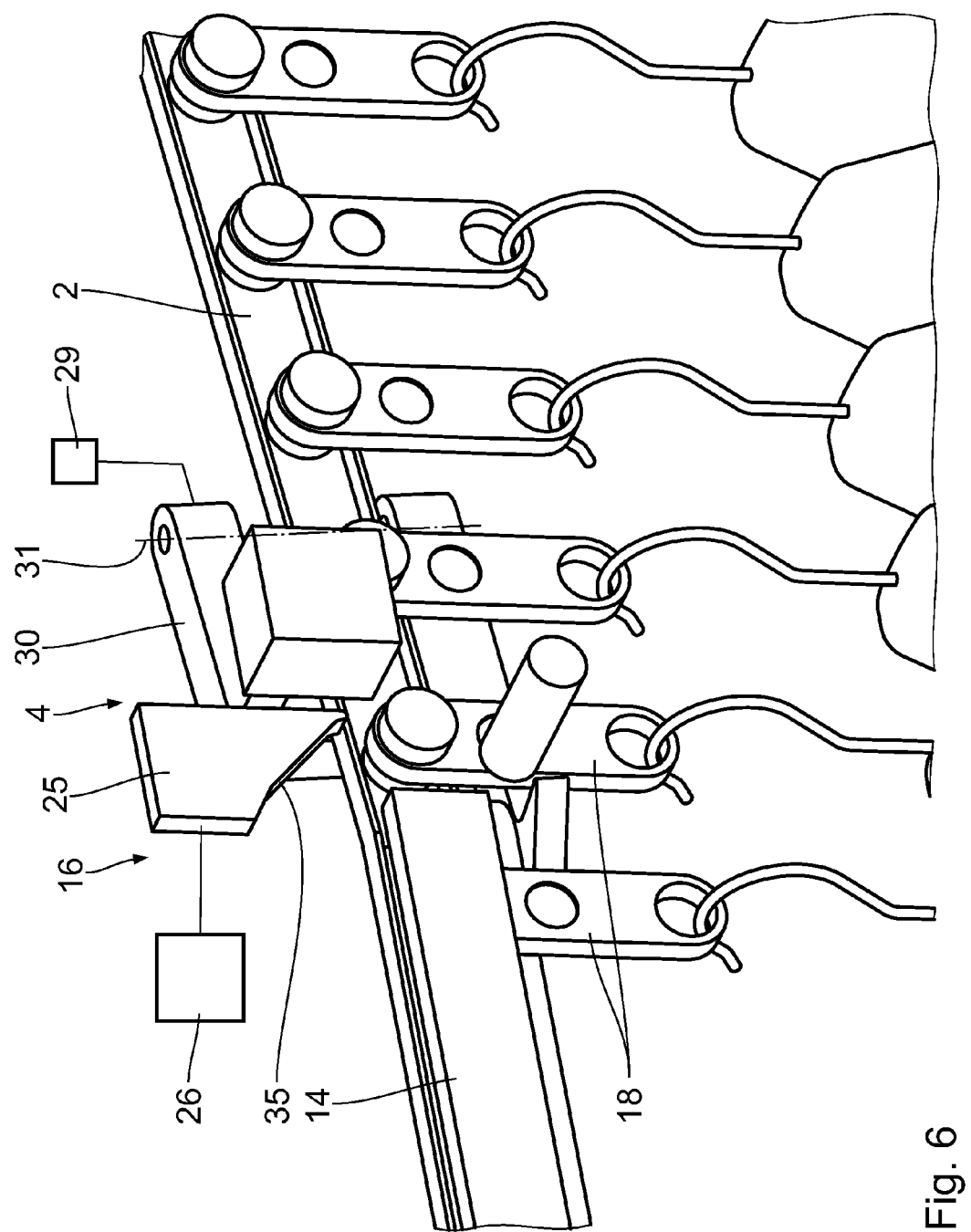
FIG. 6 shows a view corresponding to FIG. 5 with the locking unit in the locking position and the separating unit in a non-engagement position.

As soon as the first adaptor 18 facing the loading/removing rod 14 has been removed with the goods 5 fastened thereon, in other words has been displaced from the storage rod 2 to the loading/removing rod 14, the locking unit 4 and the separating unit 16 are displaced back into the respective starting position. This arrangement is shown in FIG. 6. In FIG. 6, an adaptor 18 shown on the left is arranged to the left of the claw element 30 and held on the loading/removing rod 14. This adaptor 18 is removed separately from the storage rod 2. The separating unit is located in an upper non-engagement arrangement. Proceeding from this arrangement, the separate removal of goods 5 from the storage rod 2 shown can be repeated. In this case, the sequence described above is repeated proceeding from the arrangement in FIG. 3. If additional other goods 5 stored on another storage rod 2 are to be removed, a target position is firstly approached with the rack storage and retrieval device 3, before the separate removal is then repeated on this other storage rod. The goods 5 are then retrieved from storage by means of the retrieval section 7.

In a further embodiment not shown, the rack storage facility is configured as a single-level rack storage facility. In particular, the single-level rack storage facility is substantially identical to the high-rack storage facility 1, the storage rods only being arranged with respect to one another on one level. These storage rods form a storage rod level. It is, in particular, not necessary for the rack storage and retrieval device to have a lifting drive in this case. The rack storage and retrieval device is simplified. The storage capacity in one storage rod level of the high-rack storage facility is identical to that of the single-level rack storage facility.

Figure 7:
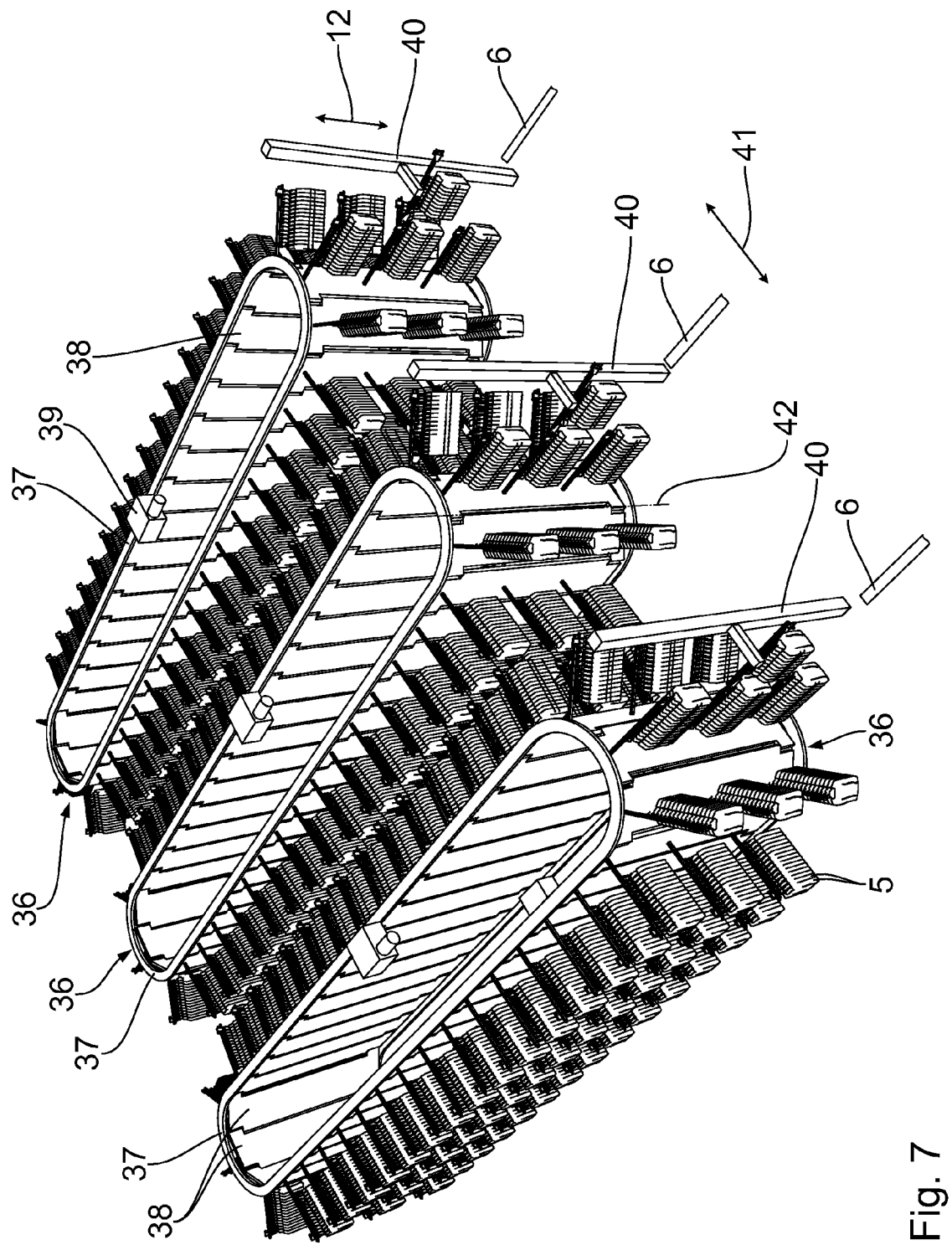
FIG. 7 shows a perspective view of an arrangement of three moving rack storage facilities each with a rack storage and retrieval device according to a further embodiment of the invention and FIG. 8 shows a perspective, enlarged view of the rack storage and retrieval device according to FIG. 7 with goods arranged thereon.
Figure 8:
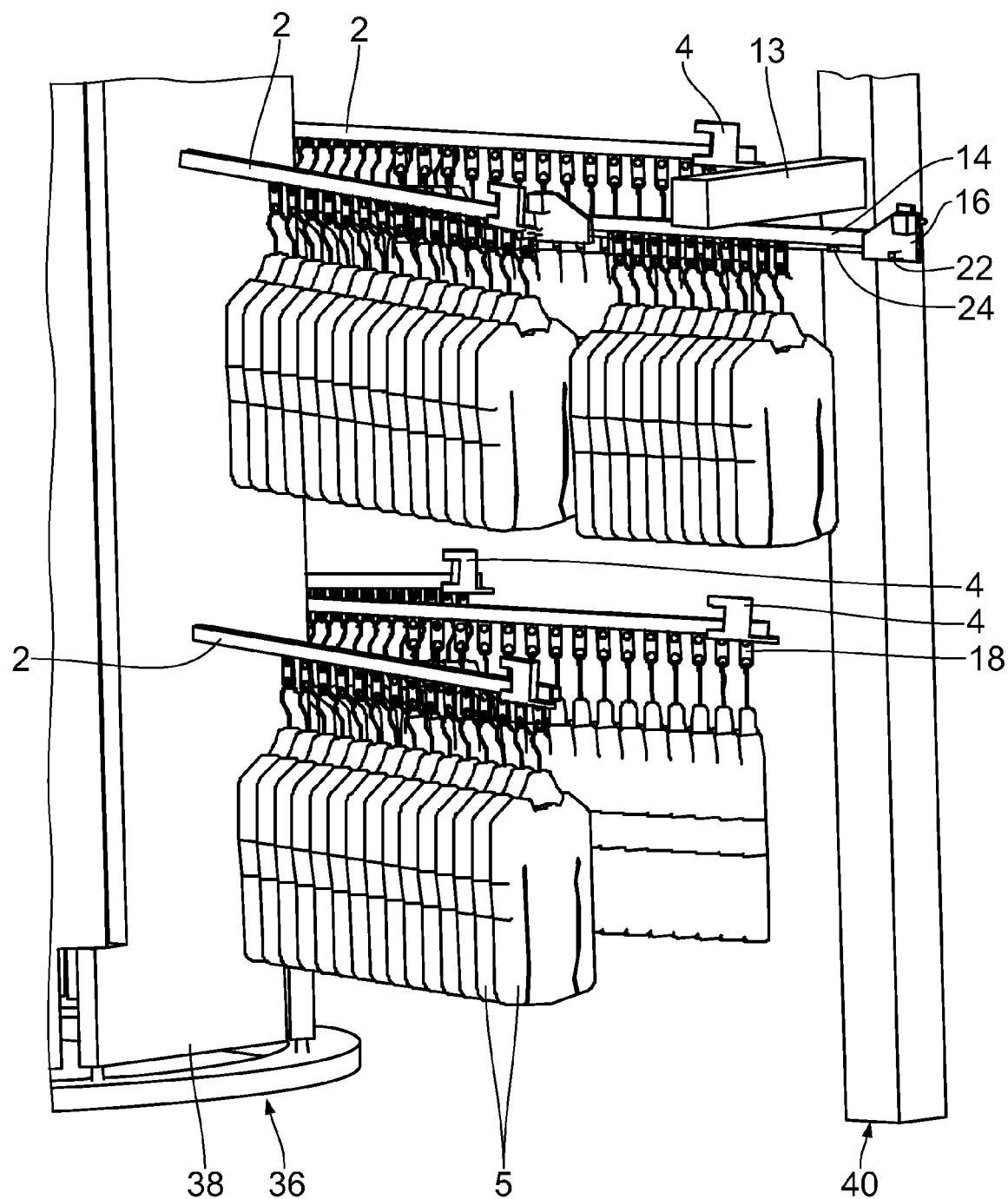

FIGS. 7 and 8 show a further embodiment of a rack storage facility 36. Components, which correspond to those which have already been explained above with reference to FIGS. 1 to 6, have the same reference numerals and will not be discussed again in detail.

The rack storage facility 36 is configured in the form of a moving rack storage facility. A storage facility of this type is also called a carousel storage facility. This means that the storage rods 2, which in the three moving rack storage facilities 36 shown in FIG. 7 are arranged vertically spaced apart from one another in three storage rack planes, can be displaced along a moving rack displacement path 37. The moving rack displacement path 37 is a closed path and allows a revolving displacement of the storage rods 2 on the moving rack storage facility. The moving rack displacement path 37 allows a continuous displacement of the storage rods 2. The moving rack displacement path 37 according to the embodiment shown comprises two longitudinal portions oriented in parallel and two semi-circular arc portions connecting the two longitudinal portions together, in each case. According to the embodiment shown, the moving rack displacement path 37 is elongate, i.e. the respective length of the longitudinal portions is greater than a perpendicular spacing of the longitudinal portions with respect to one another. In particular, the length of the longitudinal portions is twice as large and, in particular, three times as large as the perpendicular spacing. It is also conceivable for the moving rack displacement path to have another contour and, in particular, to be substantially circular, rectangular or to be configured in a different shape.

The moving rack storage facility 36 comprises a plurality of individual moving rack elements 38 that can be displaced along the moving rack displacement path 37. The individual moving rack elements 38 are in each case pivotably connected to one another with respect to a vertical axis 42. As a result, it is possible for the individual moving rack elements 38 to be displaceable along the curved arc portions of the moving rack displacement path 37. The individual moving rack elements 38 are level. Proceeding from the individual moving rack elements 38, the storage rods 2 extend outwardly in the radial direction in relation to the moving rack displacement path 37. The individual moving rack elements 38 are displaceably guided between an upper and a lower rail. Each moving rack storage facility 36 has a moving rack drive 39 to displace the individual moving rack elements 38.

A stationary rack storage and retrieval device 40 is in each case provided in a head region of the moving rack storage facility 36. The rack storage and retrieval device 40 is configured substantially analogously to the rack storage and retrieval device 3 according to the first embodiment. Since the rack storage and retrieval device 40 is stationarily arranged on the base 8, a drive on the base device can be dispensed with.

The rack storage and retrieval device 40 is arranged with respect to a corresponding moving rack storage facility 36 in such a way that the loading/removing rod 14 is arranged parallel to the longitudinal portions of the moving rack displacement path 37. The loading/removing rod 14 of the rack storage and retrieval device 40 and a storage rod 2 of the moving rack storage facility 36 then form a common transfer section when the storage rod 2 is arranged in an outer position along the moving rack displacement path 37. An arrangement of this type is shown in FIGS. 7 and 8. This arrangement is, in particular, characterized in that the storage rod 2 is arranged centrally between the two longitudinal portions in the region of the arc portion of the moving rack displacement path 37. This means that the common transfer section is formed in that a storage rod 2 is arranged along the moving rack displacement path 37 in the manner mentioned and simultaneously the loading/removing rod 14 is arranged in a vertical position corresponding to the respective storage rod 2. This means that to achieve the common transfer section, a required relative movement between the storage rod 2 and loading/removing rod 14 takes place by a displacement of the storage rod 2 along the moving rack displacement path 37 and/or of the loading/removing rod 14 along the vertical direction 12.

To feed goods 5 in the form of clothing items into the moving rack storage facility 36, a feed section 6 is provided in each case. It is also possible for only one feed section 6, which can be displaced along a transverse direction 41 in order to reach the individual rack storage and retrieval devices 40, to be provided for a plurality of moving rack storage facilities 36.

The feed sections 6 are in each case arranged at a height level of the lowermost storage rod level. The feed section 6 may, for example, be displaced along a guided movement, in particular by means of rails anchored on or in the base, along the transverse direction 41.

The feed section 6 is simultaneously used as the retrieval section. This means that goods, which have been removed separately from the moving rack storage facility 36 by means of the rack storage and retrieval device, are transferred by means of the loading/removing rod 14 for unloading onto the retrieval section, which corresponds to the feed section 6. The goods thus assembled are finally retrieved from storage by means of the retrieval section.

The functionality and, in particular, a method for separate removal of goods from the moving rack storage facility 36 is substantially identical to the method for removing goods from a high-rack storage facility according to the first embodiment, to which reference is hereby made. The important difference is that a combined displacement takes place for an arrangement of the rack storage and retrieval device 40 at the storage rod 2 with the formation of a common transport section. On the one hand, a storage rod 2, from which goods 5 are to be removed, is moved into a target position in such a way that the storage rod 2 is arranged facing and adjacent to the rack storage and retrieval device 40. This means, therefore, that the individual moving rack element 38, on which the target storage rod 2 is arranged, faces the rack storage and retrieval device 40. To remove the target goods separately, a height adjustment of the loading/removing rod 14 takes place in order to form the transport section with the storage rod 2 from the desired storage rod level.

As soon as a desired selection of goods 5 is arranged on the loading/removing rod 14, these picked goods can be retrieved from storage by means of the feed section 6. For this purpose, the loading/removing rod 14 is brought into a lower vertical position, so the loading/removing rod 14 forms a common transport section with the feed section 6.

It is also possible for a moving rack storage facility to have precisely one storage rack level. In this case, a height adjustment of the rack storage and retrieval device 40 can be dispensed with. The configuration of the rack storage and retrieval device is then simplified.

What is claimed is:

1. A rack storage and retrieval device for a rack storage facility, wherein the rack storage and retrieval device (3) comprises:
   a) a base device,
   b) at least one loading/removing rod (14) fastened to the base device,
   c) at least one loading drive (23, 24) arranged on the loading/removing rod (14) to load the rack storage facility (1) with goods (5), and
   d) a separating unit (16) for a separate removal of the goods (5) from the rack storage facility (1),
   wherein said separating unit is provided at the loading/removing rod (14), as an active component to cooperate with a passively configured component on a storage rod of said rack storage facility,
   wherein said goods (5) are arranged on said loading/removing rod (14); and
   wherein said loading/removing rod (14) is displaceable along a vertical direction (12).

2. A rack storage and retrieval device according to claim 1, comprising a control unit for the automatically controlled removal of the goods (5) from the rack storage facility (1).

3. A rack storage and retrieval device for a rack storage facility, wherein the rack storage and retrieval device (3) comprises:
   a) a base device,
   b) at least one loading/removing rod (14) fastened to the base device,
   c) at least one loading drive (23, 24) arranged on the loading/removing rod (14) to load the rack storage facility (1) with goods (5), and
   d) a separating unit (16) for a separate removal of the goods (5) from the rack storage facility (1),
   wherein said separating unit is provided at the loading/removing rod (14) as an active component to cooperate with a passively configured component on a storage rod of said rack storage facility,
   wherein said goods (5) are arranged on said loading/removing rod (14); and
   wherein said loading/removing rod (14) is displaceable along a vertical direction (12),
   wherein said rack storage and retrieval device further comprising an identification unit (22) to identify the goods (5) removed, and
   wherein said identification unit comprises one of the group of a transponder reader, a scanner and a light barrier.

4. A rack storage and retrieval device according to claim 1, wherein the separating unit (16) has an actuator (26).

5. A rack storage and retrieval device according to claim 1, wherein the separating unit (16) has a pneumatic actuator.

6. A rack storage and retrieval device according to claim 1, wherein the goods (5) are held individually on the loading/removing rod (14) by means of an adapter (18).

7. A rack storage facility comprising
   a) at least one storage rod (2) for storing goods (5) and
   b) a rack storage and retrieval device (3) for a rack storage facility comprising a base device, at least one loading/removing rod (14) fastened to the base device, at least one loading drive (23, 24) arranged on the loading/removing rod (14) to load the rack storage facility (1) with goods (5), and a separating unit (16) for a separate removal of the goods (5) from the rack storage facility (1),
   wherein said separating unit is provided at the loading/removing rod (14) as an active component to cooperate with a passively configured component on a storage rod of said rack storage facility,
   wherein said goods (5) are arranged on said loading/removing rod (14); and
   wherein said loading/removing rod (14) is displaceable along a vertical direction (12),
   wherein the loading/removing rod (14) can be arranged adjacent to the at least one storage rod (2) forming a common transfer section to load the rack storage facility (1) with goods (5) and for the separate removal of goods (5) from the rack storage facility (1).

8. A rack storage facility according to claim 7, comprising a locking unit (4) arranged on the at least one storage rod (2) for locking the goods (5) on the at least one storage rod (2).

9. A rack storage facility according to claim 8, comprising an unlocking unit (29) arranged on the loading/removing rod (14) for unlocking the locking unit (4).

10. A rack storage facility according to claim 7, comprising at least one feed section (6) and by at least one retrieval section (7).

11. A rack storage facility according to claim 7, comprising a plurality of storage rods (2), which are arranged horizontally spaced apart from one another.

12. A rack storage facility according to claim 7, comprising a plurality of storage rods (2), which are arranged vertically spaced apart from one another.

13. A rack storage facility according to claim 7, comprising a plurality of storage rods (2), which are arranged at opposing free ends (15) of the loading/removing rod (14).

14. A method for the separate removal of goods from a rack storage facility comprising the method steps
    providing a rack storage facility (1) comprising
    a) at least one storage rod (2) for storing goods (5) and
    b) a rack storage and retrieval device (3) for a rack storage facility comprising a base device, at least one loading/removing rod (14) fastened to the base device, at least one loading drive (23, 24) arranged on the loading/removing rod (14) to load the rack storage facility (1) with goods (5), and a separating unit (16) for a separate removal of the goods (5) from the rack storage facility (1),
    wherein said separating unit is provided at the loading/removing rod (14) as an active component to cooperate with a passively configured component on a storage rod of said rack storage facility,
    wherein said goods (5) are arranged on said loading/removing rod (14); and
    wherein said loading/removing rod (14) is displaceable along a vertical direction (12),
    wherein the loading/removing rod (14) can be arranged adjacent to the at least one storage rod (2) forming a common transfer section to load the rack storage facility (1) with goods (5) and for the separate removal of goods (5) from the rack storage facility (1), arranging the rack storage and retrieval device (3) at the at least one storage rod (2) forming a common transport section, separate removal of goods (5) from the rack storage facility (1) by separate transport of the goods (5) from the at least one storage rod (2) onto the loading/removing rod (14).

15. A method according to claim 14, comprising a loading of the rack storage facility (1) by means of the rack storage and retrieval device (3).

16. A method according to claim 14, comprising an unlocking of a locking unit (4) to remove the goods (5).

17. A method according to claim 16, comprising a separation of the goods (5) stored on the storage rod (2) in the unlocked state of the locking unit (4).

\* \* \* \* \*